United States Patent
Anderson et al.

(10) Patent No.: US 8,843,881 B2
(45) Date of Patent: Sep. 23, 2014

(54) TRANSPORTING AND PROCESSING FOREIGN DATA

(75) Inventors: Robert A. Anderson, Duvall, WA (US); Paul L. Bleisch, Sammamish, WA (US); Shawn L. Hargreaves, Redmond, WA (US); Michael T. Klucher, Duvall, WA (US); Josefa M. G. Nalewabau, Sammamish, WA (US); Eli J. Tayrien, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1884 days.

(21) Appl. No.: 11/622,764

(22) Filed: Jan. 12, 2007

(65) Prior Publication Data

US 2008/0171597 A1    Jul. 17, 2008

(51) Int. Cl.
*G06F 9/44* (2006.01)

(52) U.S. Cl.
USPC ........... 717/108; 717/101; 717/105; 717/120; 717/123

(58) Field of Classification Search
None
See application file for complete search history.

(56) References Cited

U.S. PATENT DOCUMENTS

| | | | | |
|---|---|---|---|---|
| 6,181,336 B1 * | 1/2001 | Chiu et al. | ..................... | 715/736 |
| 6,530,840 B1 | 3/2003 | Cuomo et al. | ................... | 463/42 |
| 6,549,922 B1 * | 4/2003 | Srivastava et al. | ..................... | 1/1 |
| 6,563,503 B1 | 5/2003 | Comair et al. | ................. | 345/473 |
| 6,785,685 B2 | 8/2004 | Soetarman et al. | ........... | 707/101 |
| 6,802,056 B1 * | 10/2004 | Chaiken et al. | ................ | 717/136 |
| 7,681,112 B1 * | 3/2010 | Francis | ......................... | 715/201 |
| 7,739,670 B2 * | 6/2010 | Gutfleisch et al. | ............ | 717/136 |
| 7,747,594 B2 * | 6/2010 | Probert et al. | ................. | 707/705 |
| 7,904,877 B2 * | 3/2011 | Multerer et al. | ............... | 717/106 |
| 8,397,223 B2 * | 3/2013 | Chiang | ......................... | 717/145 |
| 2001/0037412 A1 * | 11/2001 | Miloushev et al. | ........... | 709/315 |
| 2002/0087950 A1 * | 7/2002 | Brodeur et al. | ............... | 717/124 |
| 2003/0204481 A1 | 10/2003 | Lau | .................................. | 707/1 |
| 2004/0003370 A1 * | 1/2004 | Schenk et al. | ................ | 717/100 |
| 2004/0015834 A1 | 1/2004 | Mestre et al. | ................. | 717/106 |
| 2004/0168124 A1 * | 8/2004 | Beisiegel et al. | ............. | 715/513 |
| 2004/0230605 A1 * | 11/2004 | Tamboli et al. | ............... | 707/102 |
| 2005/0256895 A1 | 11/2005 | Dussault | ....................... | 707/102 |

(Continued)

FOREIGN PATENT DOCUMENTS

WO    WO 00/49535 A2    8/2000
WO    WO 03/009071 A1   1/2003

OTHER PUBLICATIONS

Phan, T., Zorpas, G., and Bagrodia, R., An Extensible and Scalable Adaptiation Pipeline Architecture to Support Heterogeneous Clients, ICDCS'02 (2002).*

(Continued)

*Primary Examiner* — Wei Zhen
*Assistant Examiner* — Matthew Brophy
(74) *Attorney, Agent, or Firm* — Tony Azure; Andrew Sanders; Micky Minhas (57) ABSTRACT

A set of importers accept a variety of formats of 2D and 3D content (source asset) for computer games in the format created by the artists' authoring tool. The source asset is standardized and normalized and is stored as a strongly typed object in a content object model. An object from the content object model can be deserialized to a file for debugging. The object can be converted to a managed object to which game code can be written. An executable object is generated from the object created during game development automatically.

16 Claims, 5 Drawing Sheets

(56) References Cited

U.S. PATENT DOCUMENTS

| | | | | |
|---|---|---|---|---|
| 2005/0273712 A1* | 12/2005 | Smith et al. | | 715/526 |
| 2005/0289504 A1* | 12/2005 | Buchmann et al. | | 717/102 |
| 2006/0179425 A1 | 8/2006 | Scougall et al. | | 717/140 |
| 2006/0206596 A1* | 9/2006 | Multerer et al. | | 709/220 |
| 2007/0192818 A1* | 8/2007 | Bourges-Sevenier et al. | | 725/132 |

OTHER PUBLICATIONS

Obasanjo, D., XML Serialization in the .NET Framework, MSDN (2003).*

Arnaud, Remi, and Mark C. Barnes. COLLADA: sailing the gulf of 3D digital content creation. Wellesley: AK Peters, 2006.*

Klucher, Michael. "The XNA Framework Content Pipeline" Blog entry. Aug. 31, 2006. available at <http://blogs.msdn.com/b/xna/archive/2006/08/29/730168.aspx>.*

Pulli, Kari. "New APIs for mobile graphics." Electronic Imaging 2006. International Society for Optics and Photonics, 2006.*

Dachselt, R., "CONTIGRA—Towards a Document-Based Approach to 3D Components", Dresden University of Technology, Department of Computer Science, 10 pages, http://vrlab.epfl.ch/Publications/pdf/Ponder_and_al_CGI_2003.pdf.

Kim, T., "A 3D XML-Based Modeling and Simulation Framework for Dynamic Models", A Dissertation Presented to the Graduate School of the University of Florida in Partial Fulfillment of the Requirements for the Degree of Doctor of Philosophy, University of Florida, 2002, 132 pages, http://etd.fcla.edu/UF/UFE1000134/taewoo_k.pdf.

Ponder, M. et al., "VHD++ Development Framework: Towards Extendible, Component Based VR/AR Simulation Engine Featuring Advanced Virtual Character Technologies", http://vrlab.epfl.ch/Publications/pdf/Ponder_and_alCGI_2003.pdf, 11 pages.

* cited by examiner

TRANSPORTING AND PROCESSING FOREIGN DATA

BACKGROUND

A computer game is a computer-controlled game where players interact with objects displayed on a screen. The term "computer game" also includes games which display only text or use other methods, such as sound or vibration, as their primary feedback device, or which use a controller, or which use a combination of feedback mechanisms. A video game is a computer game played on a personal computer, or on a console or arcade machine. In common usage, however, "computer game" or "PC game" refers to a game that is played on a personal computer and "console game" refers to one that is played on a device specifically designed for playing these types of games. The console typically interfaces with a standard television set. "Video game" is used to refer to any of the above and includes games made for any other device, including, but not limited to, mobile telephones, PDAs, advanced calculators, and so on.

Computer games are immensely popular, fostering a great market for new games. However, developing video games is difficult, time-consuming and there is a need to keep costs low enough to attract publisher investment. The average video game development team size as well as the average development time of a game have grown along with the size of the industry and the technology involved in creating games.

Broadly speaking, video game development includes content creation and code development. Content refers to the graphics (two-dimensional (2D) and three-dimensional (3D)), sounds and animation on which the program code of the video game operates. In the early days of game development, home computers were so limited that having specialized personnel for art was unnecessary. Up until about the early 1990s, almost all art for video games was created by the game programmers in code by specifying pixel colors and coordinates. In modern computer and video games, however, game artists create 2D art from which is developed concept art, textures or 3D models and animations. In fact, the number of game artists on a project can far exceed the number of programmers and testers on the game development team. Even when existing content is used (e.g., 2D pictures are obtained from the Internet), one of the challenges involved in the development of new video games is consuming this content because frequently, the content is not in the form required by the game engine. Artists typically generate their artwork in one of a small number of general purpose packages which are designed for producing web artwork and artwork for movies, not for producing game content. The packages produce content in any one of a number of file formats defined by the tool. These formats typically are not very close to what the game engine wants the content to look like. Therefore, a developer must typically take the content and transform it programmatically. This work is difficult and tedious and is not easily reuseable. Developers must write a lot of code and understand how the 3D content is created in order to make it compatible with the content exporters or the game engine that will consume it. Furthermore, existing content must typically undergo a conversion process so that it works properly with the other content being used. For instance, an authoring tool may describe content using procedural descriptions of the curves and modifier functions that were used to construct it, whereas the game engine just wants to consume a list of triangles. Furthermore, the format of data that can be consumed by a game engine will frequently be restricted by the implementation details of what currently available graphics cards are able to render, which is rarely a perfect match for the more flexible editable data structures used in the authoring tool. Typically, the way this problem is handled today is that people export the content to a well known format and then work with that well known format. If the artist did not originally export the file in the well known format, the game development team must go back to the artist and ask the artist to do so. This process is not easily automated and so if the artist has produced hundreds of files, each file must be exported individually. It would be helpful if there were a way to ease video game development by making the use of 2D and 3D content easier.

SUMMARY 2D and 3D content for games is transported and processed by a set of tools, including a managed runtime environment, which facilitates computer game design, development and management so that content is able to be used more easily. A set of importers are provided that can generate a number of different formats for game content. The transformed content is normalized and stored in a Document Object Model (DOM). The DOM utilizes strong typing for graphics data, from which a managed object is created so that a user can easily extend game logic on top of the content. Binary files for multiple target platforms are written without user extension. A content loader is provided that is very lightweight and easy to use. All of the components are extensible by third parties so that solutions can be provided on top of the transport and processing system.

DETAILED DESCRIPTION

Overview 2D graphics was the norm for games released through the mid-1990s but today almost all games support full 3D graphics. One of the most popular personal computer target platforms is Microsoft Windows because of its enormous user base. Popular 3D graphics APIs for Microsoft Windows are DirectX and OpenGL. Both are natively supported on most modern 3D hardware for the PC. DirectX actually is a collection of game APIs. Direct3D (sometimes called DirectX Graphics) is DirectX's 3D API. A form of Direct3D is used on Microsoft's Xbox and portable devices which run the Windows Mobile operating system). The various APIs of DirectX may be used for input, sound effects, music, networking and the playback of videos. OpenGL is a portable 3D API. Commercial libraries are also available.

3D computer graphics are works of graphic art created with the aid of digital computers and specialized 3D software. 3D computer graphics are different from 2D computer graphics in that a three-dimensional representation of geometric data is stored in the computer for the purposes of performing calculations and rendering 2D images. Sometimes these images are later displayed in a pre-rendered form, and sometimes they are rendered in real-time.

Microsoft XNA Game Studio is a set of tools, including a managed runtime environment, which facilitates computer game design, development and management. XNA Game Studio does this by freeing game designers from performing boilerplate coding, and by bringing all aspects of game production into a single system. The XNA Framework is based on the .NET Framework. It includes an extensive set of class libraries, including those specific to game development and promotes maximal code reuse across target platforms. It also includes a version of the Common Language Runtime which is optimized for gaming requirements, to provide a managed execution environment for the XNA games. The runtime is available for Windows XP, Windows Vista and the Xbox 360. Because XNA games are written for the runtime, XNA games will run on any platform supporting the XNA Framework, with minimal or no modification. Games targeting the XNA Framework can be written using the C# language although other suitable languages could be used including any managed or unmanaged language including .NET languages, Visual Basic, C++, J-Script, F#, and Iron Python and so on. In some embodiments of the invention, the language used for the games is C#.

Exemplary Computing Environment

Figure 1A:
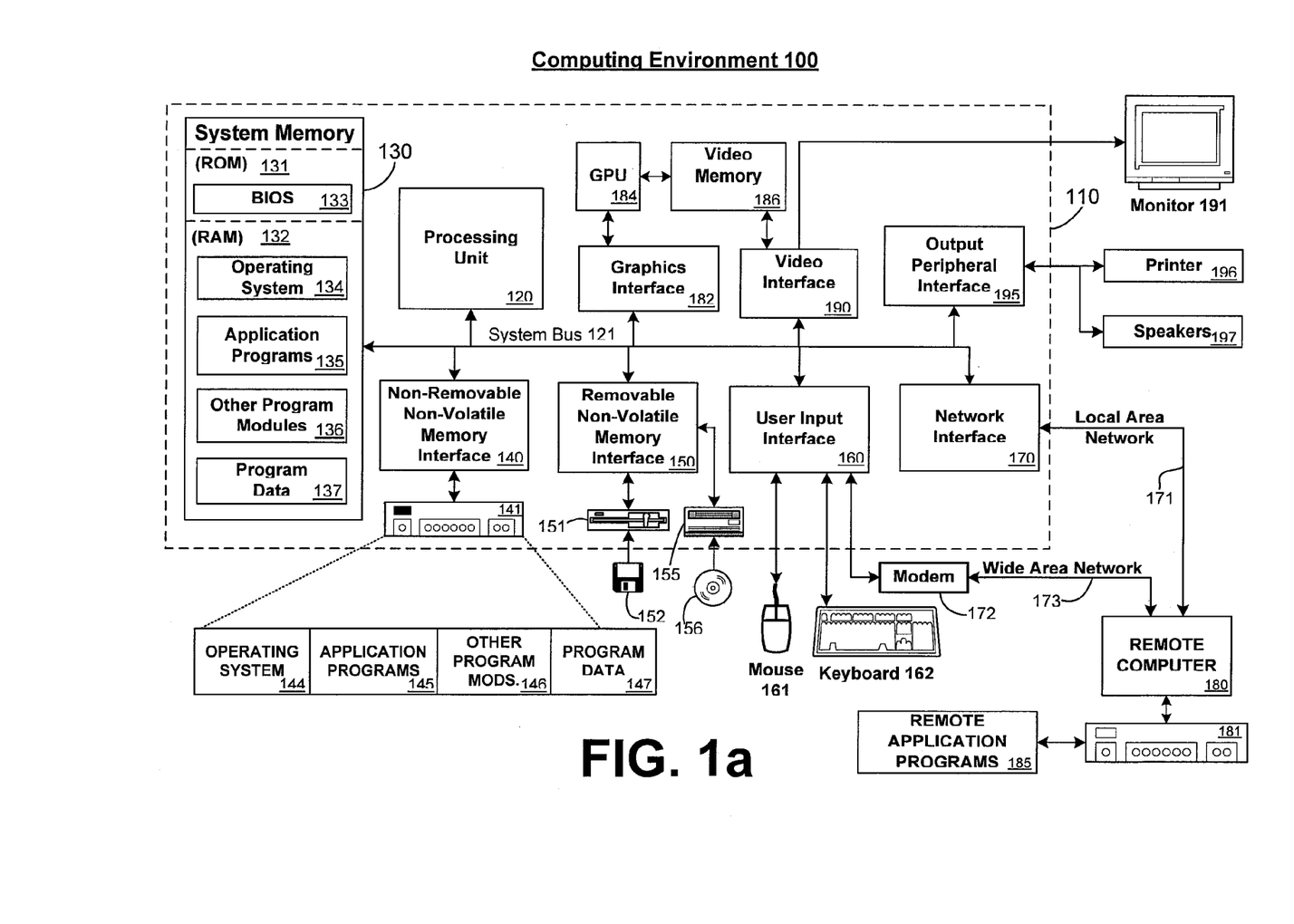
FIG. 1a is a block diagram illustrating an exemplary computing environment in which aspects of the invention may be implemented.

FIG. 1a and the following discussion are intended to provide a brief general description of a suitable computing environment in which the invention may be implemented. It should be understood, however, that handheld, portable, and other computing devices of all kinds are contemplated for use in connection with the present invention.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1a thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1a, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1a provide storage of computer readable instructions, data structures, program modules and other data for the computer 110. In FIG. 1a, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 1B:
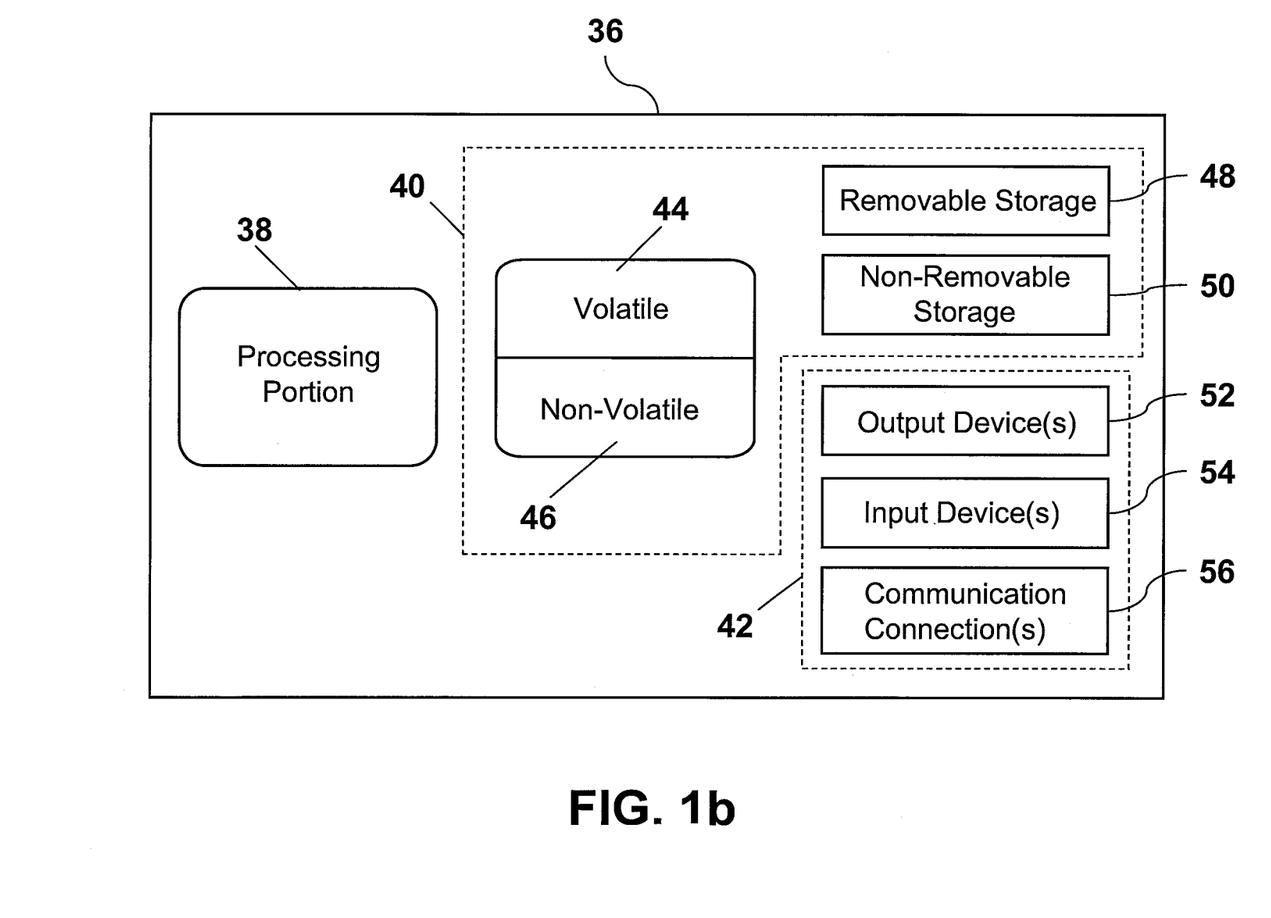
FIG. 1b is a block diagram illustrating an exemplary processor for executing games.

FIG. 1b is a diagram of an exemplary processor 36 capable of running computer games. In an example embodiment, the processor 36 comprises the game device on which game content developed as described is used. The processor 36 comprises a processing portion 38, a memory portion 40, and an input/output portion 42. The processing portion 38, memory portion 40, and input/output portion 42 are coupled together (coupling not shown in FIG. 1b) to allow communications therebetween. The input/output portion 42 is capable of providing and/or receiving components utilized when playing computer games.

The processor 36 can be implemented as a client processor and/or a server processor. In a basic configuration, the processor 36 can include at least one processing portion 38 and memory portion 40. The memory portion 40 can store any information utilized in conjunction with playing computer games, for example. Depending upon the exact configuration and type of processor, the memory portion 40 can be volatile (such as RAM) 44, non-volatile (such as ROM, flash memory, etc.) 46, or a combination thereof. The processor 36 can have additional features/functionality. For example, the processor 36 can include additional storage (removable storage 48 and/or non-removable storage 50) including, but not limited to, magnetic or optical disks, tape, flash, smart cards or a combination thereof. Computer storage media, such as memory portion 40, 44, 46, 48, and 50, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 36. Any such computer storage media can be part of the processor 36.

The processor 36 can also contain communications connection(s) 56 that allow the processor 36 to communicate with other devices, such as other devices in an online gaming scenario, for example. Communications connection(s) 56 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 36 also can have input device(s) 54 such as keyboard, mouse, pen, voice input device, touch input device, etc. Output device(s) 52 such as a display, speakers, printer, etc. also can be included. In an example embodiment, output device 52 comprises display portion 28.

Figure 1C:
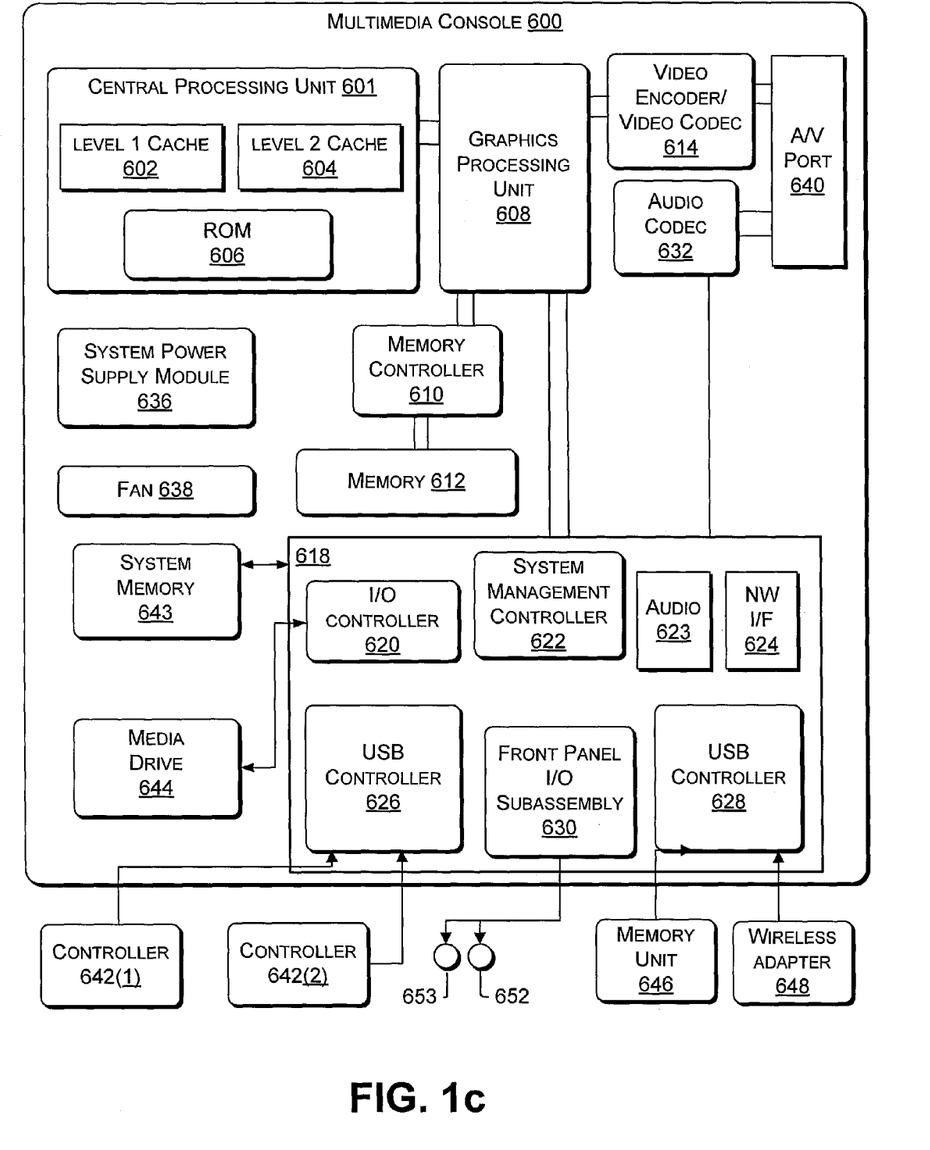
FIG. 1c is a block diagram of functional components of a multimedia/gaming console.

FIG. 1c illustrates functional components of a multimedia/gaming console 600 that on which game content developed as described herein executes. In an example embodiment, the multimedia console 600 represents a more detailed depiction of a game device, such as the processor 36 implemented as a game device. In this example embodiment, the memory portions, processing portions, and the input/output portions of the multimedia console 600 are capable of performing the functions of the memory portions, processing portions, and the input/output portions of the processor 36, respectively. The multimedia console 600 has a central processing unit (CPU) 601 having a level 3 cache 602, a level 2 cache 604, and a flash ROM (Read Only Memory) 606. The level 3 cache 602 and a level 2 cache 604 temporarily store data and hence reduce the number of memory access cycles, thereby improving processing speed and throughput. The CPU 601 can be provided having more than one core, and thus, additional level 3 and level 2 caches 602 and 604. The flash ROM 606 can store executable code that is loaded during an initial phase of a boot process when the multimedia console 600 is powered ON.

A graphics processing unit (GPU) 608 and a video encoder/video codec (coder/decoder) 614 form a video processing pipeline for high speed and high resolution graphics processing. Data is carried from the graphics processing unit 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, such as, but not limited to, a RAM (Random Access Memory).

In an exemplary embodiment, the multimedia console 600 includes an input/output (I/O) controller 620, a system management controller 622, an audio processing unit 623, a network interface controller 624, a first USB host controller 626, a second USB controller 628 and a front panel I/O subassembly 630 that can be implemented on a module 618. The USB controllers 626 and 628 serve as hosts for peripheral controllers 642(1)-642(2), a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and can be any of a wide variety of various wired or wireless adapter components including an Ethernet card, a modem, a Bluetooth module, a cable modem, and the like.

System memory 643 is provided to store application data that is loaded during the boot process. A media drive 644 is provided and can comprise a DVD/CD drive, hard drive, or other removable media drive, etc. The media drive 644 can be internal or external to the multimedia console 600. Application data can be accessed via the media drive 644 for execution, playback, etc. by the multimedia console 600. The media drive 644 is connected to the I/O controller 620 via a bus, such as a Serial ATA bus or other high speed connection (e.g., IEEE 3394).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 653 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 600 is powered ON, application data can be loaded from the system memory 643 into memory 612 and/or caches 602, 604 and executed on the CPU 601. The application can present a graphical user interface that provides a consistent user experience when navigating to different media types available on the multimedia console 600. In operation, applications and/or other media contained within the media drive 644 can be launched or played from the media drive 644 to provide additional functionalities to the multimedia console 600.

The multimedia console 600 can be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 can further be operated as a participant in the larger network community, such as an online gaming community for example.

Transport and Processing of Foreign Data

Figure 2:
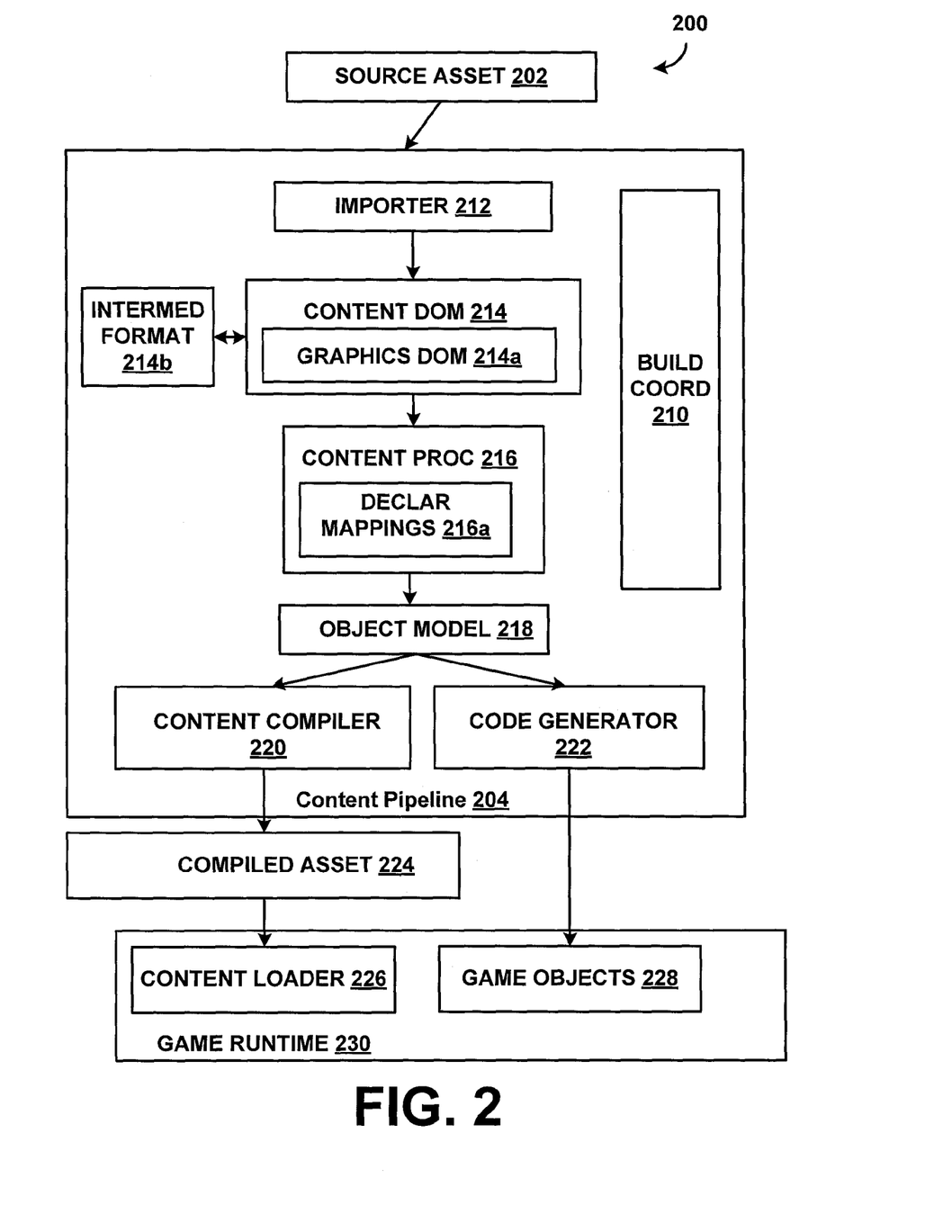
FIG. 2 is a block diagram of a system for transport and processing of foreign data in accordance with some embodiments of the invention.

FIG. 2 illustrates an exemplary system 200 for the transport and processing of foreign data in accordance with some embodiments of the invention. System 200 may reside on one or more computers such as the one illustrated above with respect to FIG. 1a, 1b and/or 1c. The XNA Framework Content Pipeline 204 may include one or more of the following computer components or modules: build coordinator 210, importer 212, content DOM 214, content processor 216, game object model 218, content compiler 220 and code generator 222.

In accordance with embodiments of the invention, build coordinator 210 manages the flow of game content through the various importers, content processors and serialization mechanisms, described more fully below. The build coordinator is responsible for coordinating the build process. It calls the various importers, content processor and serializers in the appropriate sequence and keep track of intermediate file names. It also performs incremental checks to make sure that the build coordinator does not perform any unnecessary work. For instance if a particular asset such as but not limited to a mesh or texture, has not changed since the previous time the content was built, there is no need to waste time rebuilding that file, or if the same texture is referenced by several different meshes, it only needs to be built once and the results of that processing can be shared by all the meshes that use the texture.

Importer 212 may accept input files (source assets 202) in the format in which authoring tools such as 3D Studio Max and Maya developed by Autodesk Media & Entertainment, LightWave and SoftImage present them. Importer 212 pulls content from the source assets files as part of the game build process. The source assets may be 3D file formats such as .FBX and .X, 2D file formats such as .DDS, .BMP. .JPG, .PNG, .TGA, material file formats such as .FX and audio file formats such .XAP. Importer 212 takes the content, conditions it and normalizes it in into a common format. Normalization in the context of content processing acts to bring the content into a range that is more standardized, hence the term normalization. Often, the motivation is to achieve range consistency. The importer component of the system in some embodiments of the invention is extensible—that is third parties can add their own importers into the build system to support other file formats from other tools.

Thus, in contrast to traditional approaches in which extensions for authoring tools are written in order to export content in a format that is more suitable for use in games programming, the importers of embodiments of the invention import content in whatever format the authoring tool produces, extracts the necessary information, conditions it, normalizes the content and outputs the content in a common format.

The content generated from the importer is provided to the Content DOM (Document Object Model). The DOM is an object model defined in managed code, that stores the game content in a standardized way. The DOM is a set of classes that hold game content data and enforce desirable characteristics of the game data. The Content DOM converts the data into a standard format so that all the processing that must be performed on the data to convert it into game format can begin from a known common point, increasing the reusability of the content.

Suppose, for example, a developer is writing a game and starts with the content generated by the 3D Studio Max authoring tool. Suppose the developer writes a quantity of code to convert the 3D Studio Max file into his game format. If either the game or the authoring tool for the artist to use changes, the code the developer has written cannot be reused: the developer has to start over from scratch. In contrast, by converting the file into a standard object model using the Content DOM, the content generated is more readily reusable because it conforms to a standard structure. The DOM categorizes the content data into standardized pieces that can be separately accessed (e.g., a vehicle X may include one or several wheels W. By categorizing the vehicle X as composed of parts including wheels W, an already-created wheel W can be used in another item (such as another vehicle Y). It will be appreciated that the DOM generates a standardized in-memory representation of the content which is accessible via an API, enabling the system to work with the vendor's processor(s) as well as the processors of third parties. Thus the Content DOM and the Graphics DOM abstract the differences in the file formats generated by different authoring tools. It also decouples the import process from the process that converts the data to game format, enabling these two processes to work independently, which traditionally has been performed as one integrated step.

The DOM in some embodiments of the invention imposes strong typing on graphics data. Strong typing means that the programming language or implementation enforces constraints upon programs, preventing them from running code which uses data in an invalid way. For instance, an integer addition operation may not be used upon strings; a procedure which operates upon linked lists may not be used upon numbers. Typically the language compiler performs checks for type constraint violations. Operations or function calls which attempt to disregard data types are prohibited. Implicit type conversion is not allowed. (Values of one type cannot be converted to another type, implicitly.) The content processor performs explicit type conversions automatically (without requiring a human to produce the conversion code). Types include geometry, materials textures, bones/weights, animation and hierarchy. Thus, the Content DOM abstracts the differences between digital content creation tools including but not limited to the ones listed above so that a consistent view of the source content as managed objects is provided. The Content DOM defines base types and building block functionality for use by more specialized object models such as the Graphics DOM. The Graphics DOM defines intermediate types 214b for representing and manipulating content including graphic and non-graphic assets such as audio and animation. The DOM in some embodiments of the invention generates the standard structure by serializing and deserializing content data. The object can be serialized to a file (an intermediate format) for debugging.

One or more content processors such as content processor 216 uses the standardized data created by the Content DOM 214 to create managed objects and to transform the data for use during execution of the game. A processor 216 converts between the document object model objects and the execution or runtime types. In some embodiments of the invention, the language used for the processors is C#. A processor 216 may be written for simplistic objects such as a Mesh, Texture or Effect or for complex game types such as a game character or vehicle. Declarative mappings are used in some embodiments of the invention to create a processor using a simple markup method. The declarative statements are used by the build coordinator to generate code to create the processor. Hence, declarative mappings functionality 216a provides an easy way to define and refer to an object in the object model 218 that may use a number of processors. The declarative mappings provide a way to identify the content in a way that makes it easy for the person writing the code to reference and manipulate. For example a processor that is converting a car model for use in a racing game might want to separate the source artwork into separate meshes for the body of the car, the wheels, and the doors, so that the game can easily make the wheels spin when it comes to display the car model. This can easily be implemented by using a query expression to search the Graphics DOM object model, locating particular objects that have been marked as wheels.

A content compiler 220 takes the data created by the content processors stored in the object model 218 and converts it into a tightly packed binary format suitable for a game console such as Xbox or for PC platforms. The content compiler 220 serializes processor data into a binary bitstream. It also provides an incremental build for content so that only the items that have actually changed are rebuilt instead of rebuilding everything in the project as is traditionally the case in game building. The content compiler also determines dependencies (this piece of code requires another piece of code to run) and rebuilds all the dependencies too. The content compiler 220 also generates a list of build errors. When the user creates a class via a processor or declarative mapping, the user has created a design-time class. Typically a user will develop a game on a PC even if the game when built will run on a console and will be subject to the hardware characteristics of the graphics card of the console. Thus, the design time object and the object that will be executed (the runtime object) are not the same. The code generator 222 takes the user defined class (as a processor or declarative map) and converts it to the proper class required for execution. It also creates a class the user can use when writing game logic code. This way the user does not have to use different processors for the target platform which makes is easier to build cross-platform games. The content loader 226 is the portion of the system used during execution of the game (game runtime 230). It is responsible for converting compiled content (e.g., compiled asset 224) into executable game objects (e.g., game object 228). Assets are identified by unique names. The loader loads in associated data for the asset and manages the execution lifetime of the object and unloading of the object following execution.

Figure 3:
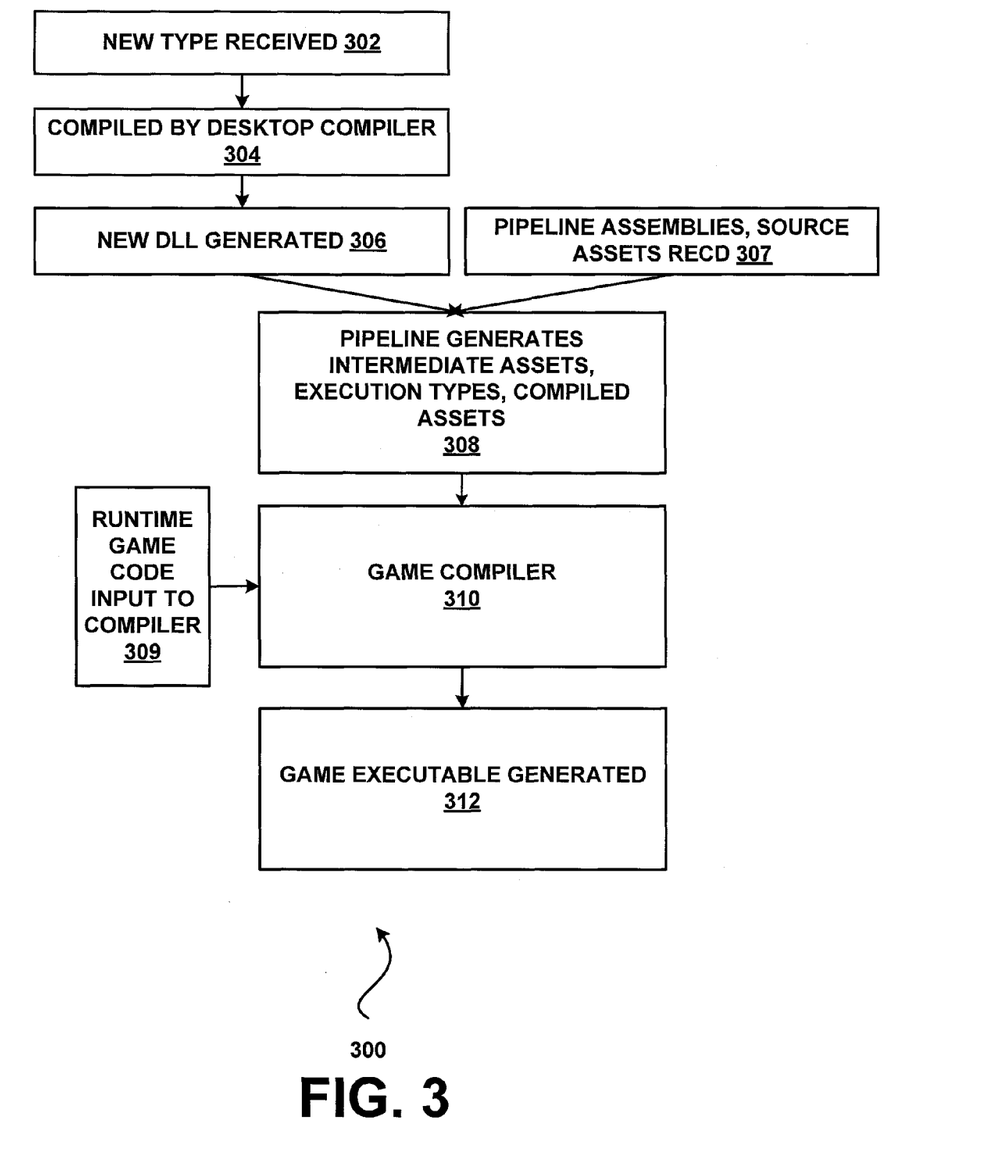
FIG. 3 is a flow diagram of a method for transport and processing of foreign data in accordance with some embodiments of the invention.

FIG. 3 is a flow diagram of a method 300 for transporting and processing foreign data in accordance with embodiments of the invention. In FIG. 3, at 302, a new type is received. This new type may be created by a game developer in C#code, for example. The new type may be created for a particular video game, for instance and be compiled at 304 by a desktop compiler. Usually games are developed on a regular computer, not on the computer (e.g., gaming computer such as the one described in FIG. 1a or game console such as the one described in FIG. 1c) that the computer is run on. At 306, the desktop compiler generates the new dll for the new type. This dll and external pipeline assemblies provided by the game development system, (307) and the source assets (2D and 3D output from the authoring tools) are delivered to the content pipeline, as described above with respect to FIG. 2. The content pipeline at 308 can generate intermediate files which are an XML representation of the data inside the Content DOM, as described above. The intermediate files may represent a serialized text representation of the objects in the object model which may be used for debugging. The content pipeline can also receive intermediate files and deserialize them into objects in the object model. At 308 the game pipeline also may generate a runtime type corresponding to the design time type received at 302 (typically creating a .cs file). The content pipeline may also generate compiled assets .xnb files representing converted content files (from the source assets .fbx and .tga files received at 307.) 302 through 308 are events that transpire during design (development) of the game. 309-312 transpire during execution of the game. At 310, the game compiler receives the runtime game code 309 which in some embodiments of the invention includes the game code that was generated by the content pipeline and the bulk of the game logic code that was written manually by the game developer and the runtime types corresponding to the design types from 308 and from them generates an executable (312) that can run using the .xnb files created at 308.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. An apparatus comprising;
a processor; and
memory coupled to the processor, the memory comprising executable instructions that when executed by the processor cause the processor to effectuate operations comprising:
importing game content into content pipeline, the content pipeline comprising:
a content document object model:
a graphics document object model, wherein the content document object model and the graphics document object model abstract differences between various file formats of various authoring tools; and
an importer application;
executing the importer application that accepts a plurality of file formats from the various authoring tools, in the various file formats, a source asset comprising a file containing game content exported from a content authoring tool, extracts the game content from the file, and normalizes the extracted game content into a normalized standardized format;
using the transformed game content to generate a compiled asset; and
converting the compiled asset into at least one executable game object.

2. The apparatus of claim 1, further comprising:
a content document object model (DOM), which receives the transformed game content, categorizes the game content into standardized pieces, and stores the standardized pieces in a standardized way that permits individual access of component piece, of the game content.

3. The apparatus of claim 2, wherein the content object model separates importation of the source asset from conversion of the source asset to a game format into two steps that can be individually initiated.

4. The apparatus of claim 1, further comprising a serialization mechanism which serializes source asset data into an object model using strong typing.

5. The apparatus of claim 1, further comprising at least one content processor that creates an object from standardized serialized data of a content object model for storing a standardized, normalized in-memory representation of the source asset.

6. The apparatus of claim 1, further comprising a code generator that creates an object capable of execution on a gaming computer or on a game console, the object corresponding to an object of a content object model created during game development.

7. The apparatus of claim 1, wherein the game content comprises two-dimensional graphics content, three-dimensional graphics content, sound content or game data.

8. A method comprising:
- importing game content, exported from at least one content authoring tool, into a content pipeline comprising:
- a content document object model: and
- a graphics document object model, wherein the content document object model and the graphics document object model abstract differences between various file formats of various authoring tools:
- importing, a source asset comprising game content generated by any of a variety of content authoring tools by using an importer application that accepts at least two different file formats;
- extracting the game content from the source asset;
- transforming the extracted game content to a normalized standardized format, the transforming comprising normalizing the extracted game content;
- generating from the normalized game content, a strongly typed object;
- converting the strongly typed object into a game object model; and
- generating from the game object model an object for execution on a gaming computer or on a game console.

9. The method of claim 8, further comprising:
- deserializing the normalized standardized format into an intermediate file for debugging.

10. The method of claim 8, further comprising generating code for an object executable on the game console corresponding to the object of the game object model created from the source asset in managed code.

11. The method of claim 8, further comprising:
- storing the source asset which has been converted into the normalized standardized format.

12. The method of claim 11, wherein the normalized standardized format is a source object model and is mapped into a target model of managed objects.

13. The method of claim 8, wherein the game content comprises two-dimensional graphics content, three-dimensional graphics content, sound content or game data.

14. A computer-readable storage medium that is not a propagating signal, the computer-readable storage medium comprising computer-executable instructions that when executed by a processor cause the processor to effectuate operations comprising:
- importing game content, exported from at least one content authoring tool, into a content pipeline comprising:
- a content document object model; and
- a graphics document object model, wherein the content document object model and the graphics document object model abstract differences between various file formats of various authoring tools;
- importing a source asset comprising the game content generated by any of a variety of content authoring tools by using an importer application that accepts at least two different file formats;
- extracting game content from the source asset, normalizing the extracted game content into a standardized format;
- using the normalized game content to create at least one managed object; and
- converting the data in the at least one managed object into a binary format for executing a game.

15. The computer-readable storage medium of claim 14, the operations further comprising: running the game on a game console.

16. The computer-readable storage medium of claim 14, the operations further comprising: running the game on a gaming computer.

* * * * *